(12) United States Patent
Olmi

(10) Patent No.: US 12,440,796 B2
(45) Date of Patent: Oct. 14, 2025

(54) SYSTEM FOR ELIMINATING BAD-SMELLING EMISSIONS FROM INDUSTRIAL PROCESSES

(71) Applicant: VALLI ZABBAN S.P.A, Calenzano (IT)

(72) Inventor: Eugenio Olmi, Prato (IT)

(73) Assignee: VALLI ZABBAN S.P.A, Calenzano (IT)

( * ) Notice: Subject to any disclaimer, the term of this patent is extended or adjusted under 35 U.S.C. 154(b) by 677 days.

(21) Appl. No.: 17/609,342

(22) PCT Filed: May 7, 2020

(86) PCT No.: PCT/IB2020/054353
§ 371 (c)(1),
(2) Date: Nov. 5, 2021

(87) PCT Pub. No.: WO2020/225775
PCT Pub. Date: Nov. 12, 2020

(65) Prior Publication Data
US 2022/0176302 A1    Jun. 9, 2022

(30) Foreign Application Priority Data

May 7, 2019   (IT) .......................... 102019000006601

(51) Int. Cl.
*B01D 47/02*       (2006.01)
*B01D 47/14*       (2006.01)
(Continued)

(52) U.S. Cl.
CPC .......... *B01D 47/024* (2013.01); *B01D 47/14* (2013.01); *B01D 53/14* (2013.01); *F23J 15/022* (2013.01);
(Continued)

(58) Field of Classification Search
CPC ...... B01D 47/024; B01D 47/14; B01D 53/14; B01D 2252/60; B01D 2257/702; F23J 15/022; F23J 2217/50
(Continued)

(56) References Cited

U.S. PATENT DOCUMENTS

| 4,153,471 A | * | 5/1979 | Mendenhall ............ F23G 7/065 |
| | | | 423/210 |
| 10,080,987 B1 | | 9/2018 | Crawford et al. |
| 2012/0157740 A1 | | 6/2012 | Montalbano et al. |

FOREIGN PATENT DOCUMENTS

| CN | 105157045 A | * | 12/2015 | |
| CN | 106009728 A | * | 10/2016 | .............. C08L 95/00 |

(Continued)

*Primary Examiner* — Qianping He
(74) *Attorney, Agent, or Firm* — Maschoff Brennan

(57) ABSTRACT

A process and related plant are used for treating a raw vent gas containing bitumen vapours released by equipment of a polymer-bitumen membranes production line, in which operations involve a filler powder, such mixing the filler powder with the bitumen, during which the filler powder is incorporated into the raw vent gas that is initially powder-free. The process includes first conveying the raw vent gas into a gas-washing device along with a solution of a surfactant and then contacting the raw vent gas with the solution and removing the powder from the powder-containing gas. A purified vent gas that is substantially free from the filler powder is released. The purified vent gas is conveyed into a boiler, and the bitumen vapours are burned. The process prevents the powder from quickly reaching the boiler making the burner and the heat-exchange surfaces ineffective.

5 Claims, 6 Drawing Sheets

(51) Int. Cl.
  *B01D 53/14*   (2006.01)
  *F23J 15/02*   (2006.01)
(52) U.S. Cl.
  CPC .... *B01D 2252/60* (2013.01); *B01D 2257/702* (2013.01); *F23J 2217/50* (2013.01)
(58) Field of Classification Search
  USPC .......................................................... 96/243
  See application file for complete search history.

(56) References Cited

FOREIGN PATENT DOCUMENTS

| | | | |
|---|---|---|---|
| CN | 106110858 A | * | 11/2016 |
| CN | 106669394 A | * | 5/2017 |
| CN | 208426826 U | * | 1/2019 |
| CN | 208493728 U | | 2/2019 |
| EP | 0 499 664 A1 | | 8/1992 |
| EP | 1 867 784 A1 | | 12/2007 |
| EP | 3 018 410 A1 | | 5/2016 |

* cited by examiner

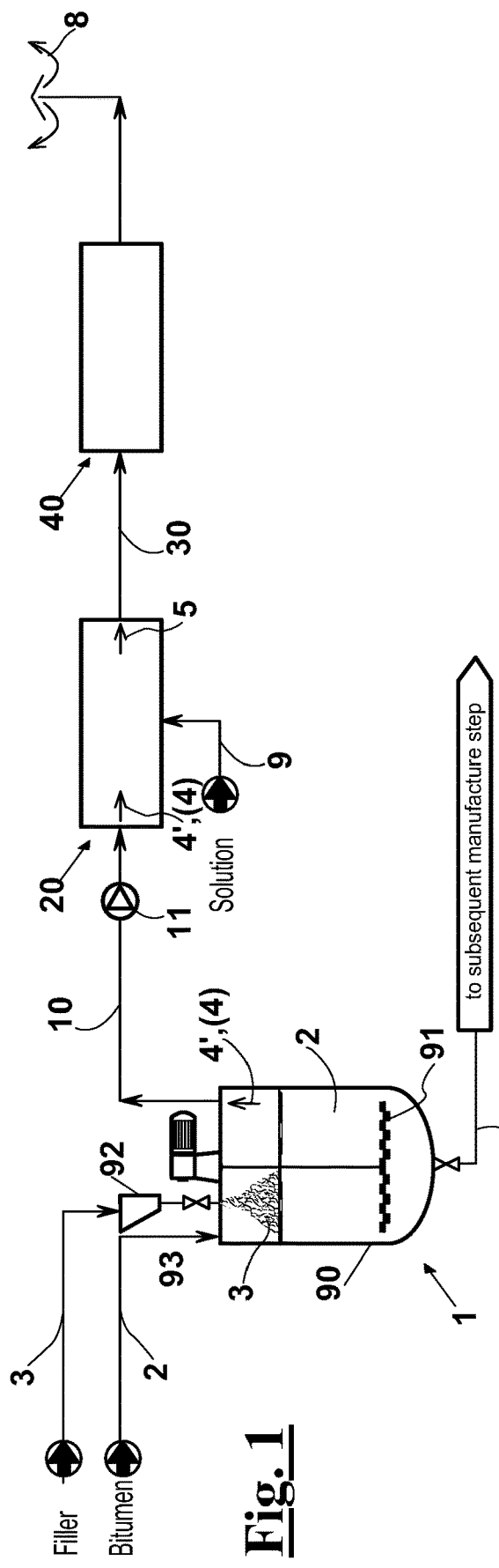
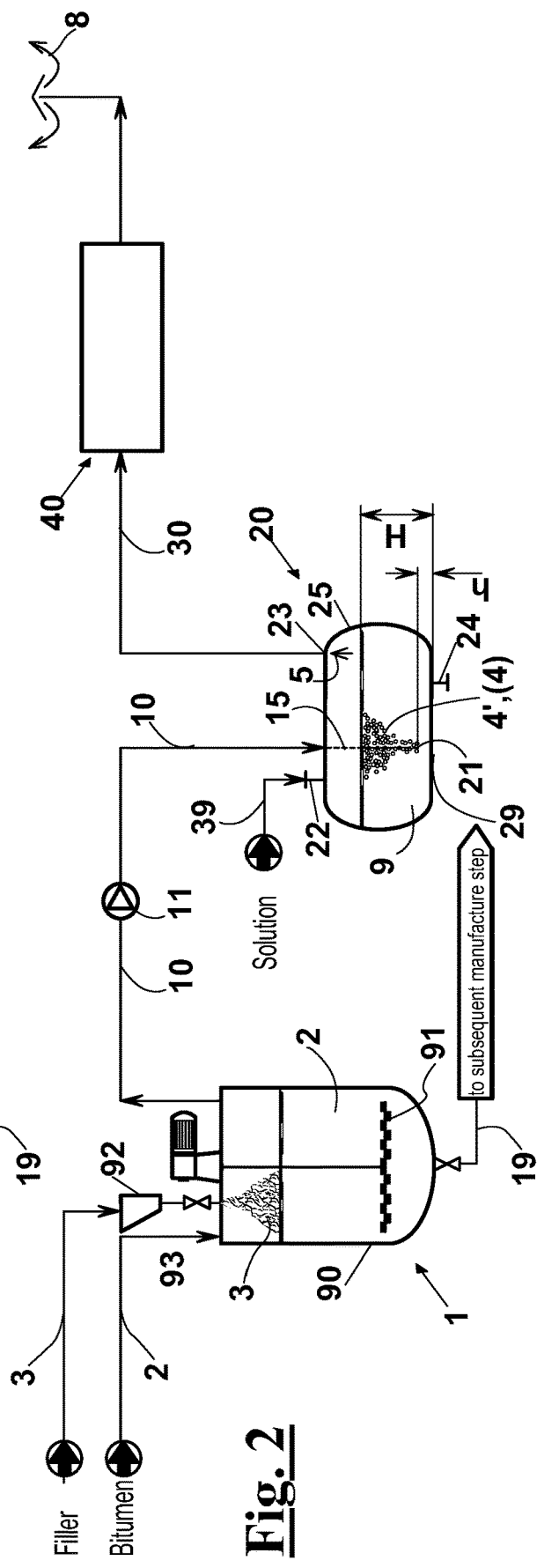

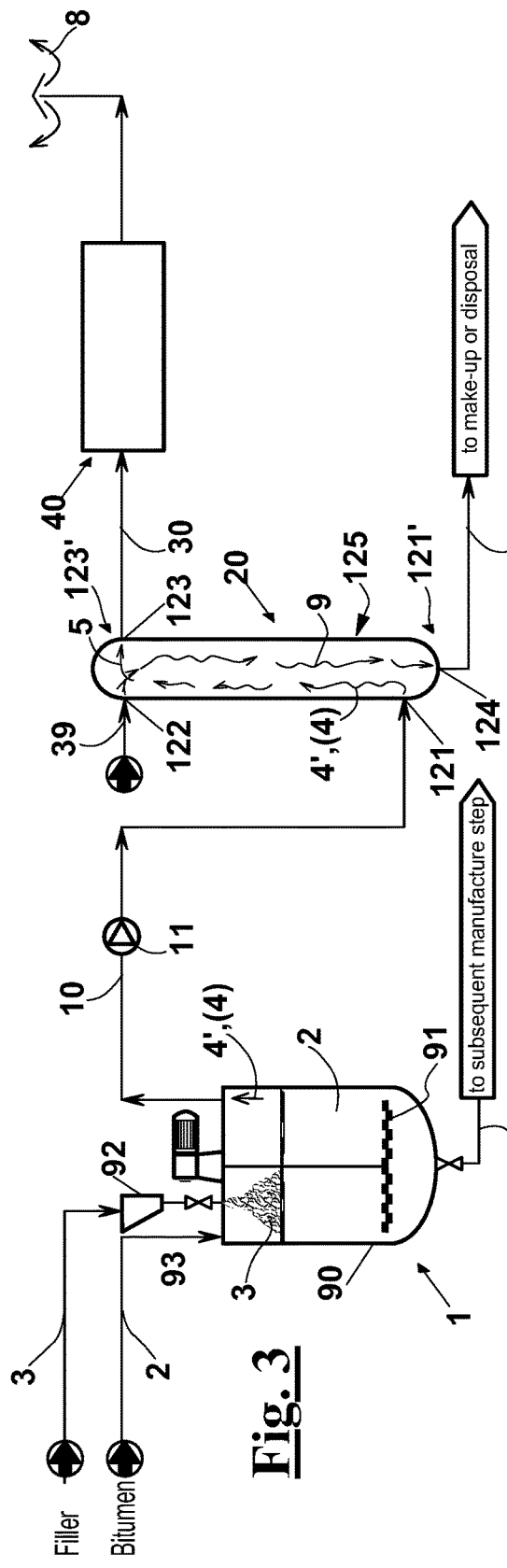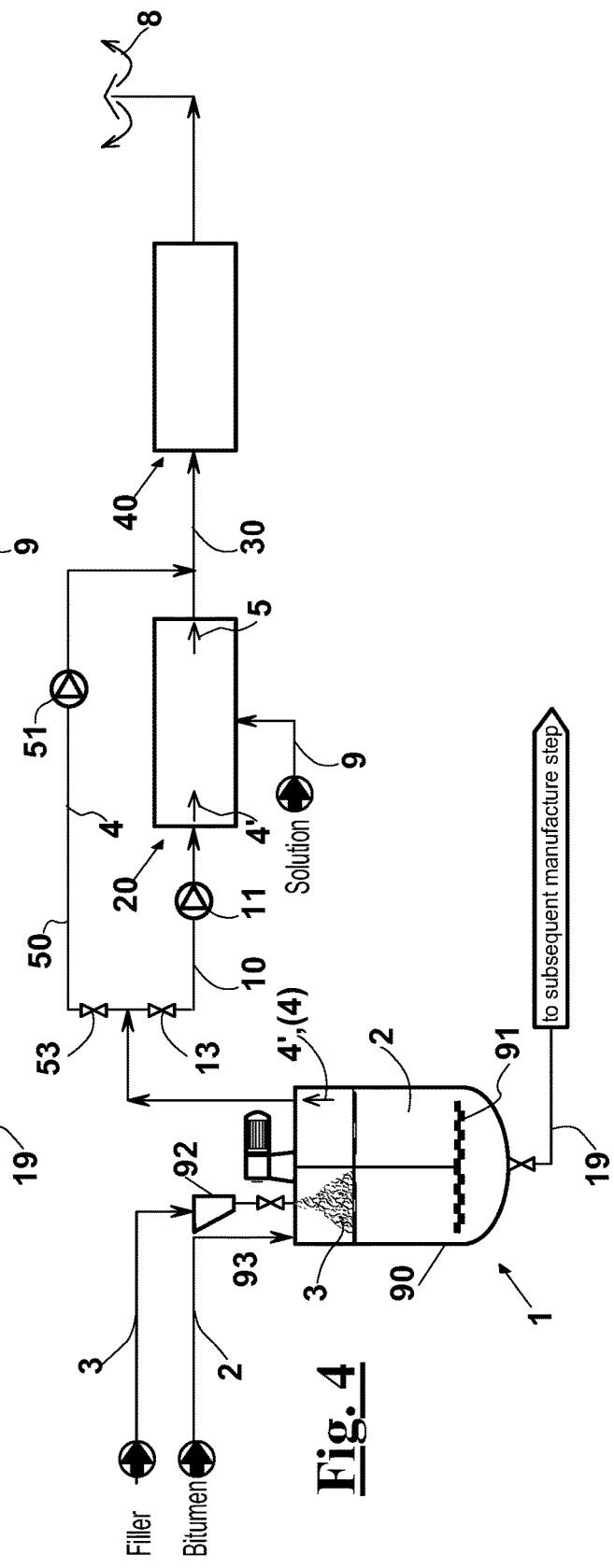

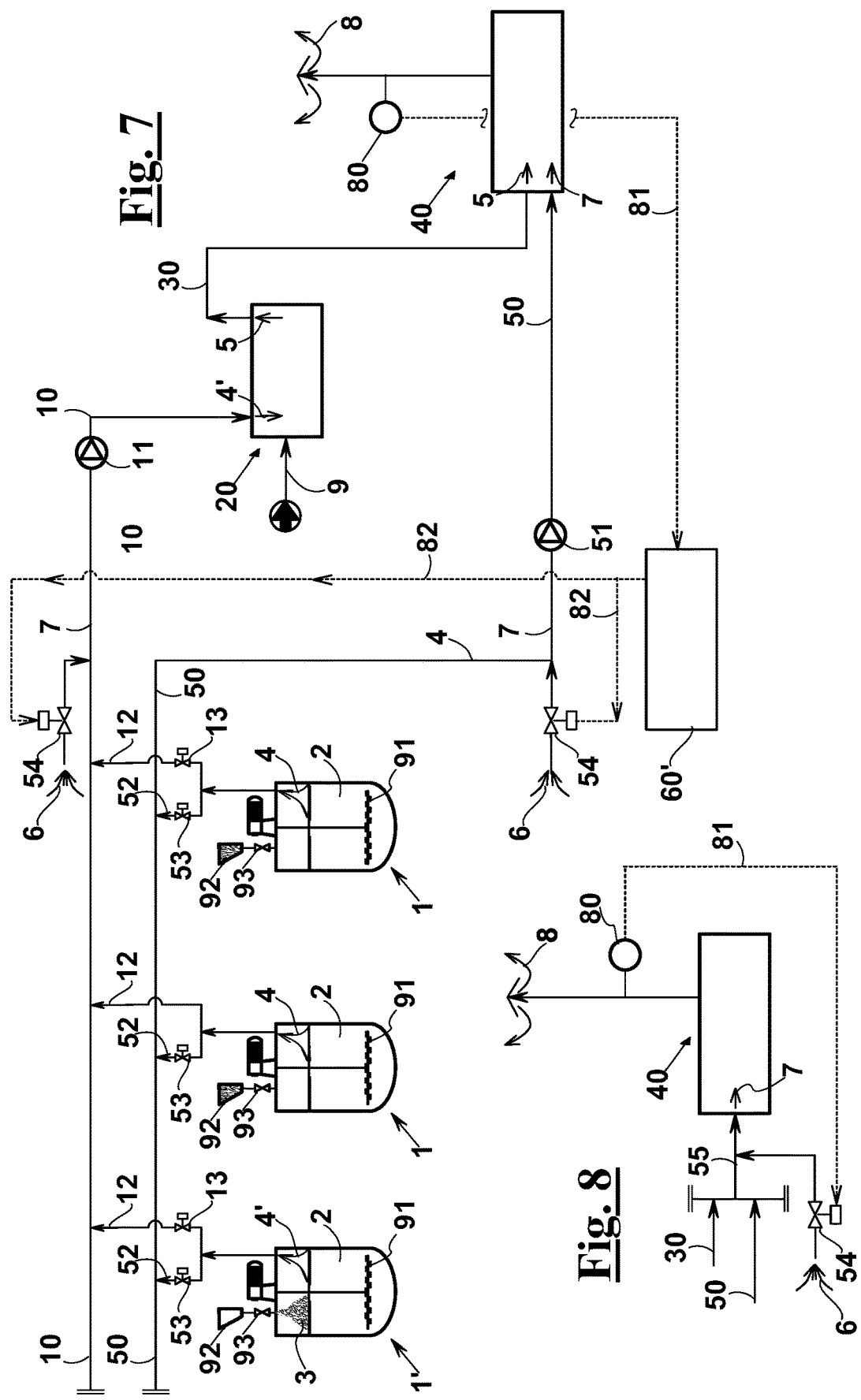

SYSTEM FOR ELIMINATING BAD-SMELLING EMISSIONS FROM INDUSTRIAL PROCESSES

FIELD OF THE INVENTION

The present invention relates to an improved process and to an improved plant for treating bitumen vapours emitted by pieces of equipment of plants treat bitumen and powders. A typical example of such a plant is a polymer-bitumen membranes production line.

BACKGROUND OF THE INVENTION

As well known, the polymer-bitumen membranes are manufactured by hot impregnation of a polymer support armature with bitumen. The bitumen is normally provided at a temperature of about 120-130° C., so that it is fluid enough to be easily conveyed and easily used for impregnation. Due the temperature and the vapor pressure of bitumen, relatively important amounts of bad-smelling and potentially harmful bitumen vapours are present in the vent gas from the pieces of equipment in which the bitumen is stored and processed. These vapours must therefore be removed from the vent gas before it is emitted into atmosphere.

EP 3018410 A1 discloses a plant and a method for treating bitumen vapours, in which systems are provided for extracting the vapours and for mixing hem with external air, for feeding the obtained vapour/air mixture into a boiler as primary air, and for adjusting the vapour/external air proportion based on the composition of the combustion gas produced by burning the mixture.

Such invention makes it possible to reduce the amount of pollutants emitted into atmosphere along with the combustion gas within the limits set by the regulations and, less successfully, makes it possible to reduce the emitted bad-smelling substances (volatile hydrocarbons) contained therein within acceptability limits. This is an improvement of previous techniques for treating vapours of bitumen, which involve steps of sucking and conveying the vapours through active coal filters, washing towers and other devices. The solution of EP 3018410 A1 is particularly well-suited for vapours coming from bitumen storage tanks.

However, as well known, before the impregnation, a very fine and impalpable mineral filler powder is added to the bitumen, for instance talc is added, which has normally a maximum of the grain size distribution curve at about 0.7 µm. This powder is mainly introduced as a release agent. In fact, the manufactured membranes are wound to form rolls to be more easily transported and sold, and such rolls could not be easily unwound when the membrane is used.

Unavoidably, a certain amount of the filler powder is sucked through the gas vent ducts from the pieces of equipment of the production line along with the vapours sent to combustion. Particularly critical are the piece of equipment known as "melting tank", which are stirred tanks in which the filler is mixed to the bitumen. The powder suction mainly occurs when the filler is fed into such these pieces of equipment, and until it is not fully incorporated into the bitumen by stirring.

In a plant like the one described in EP 3018410 A1, the powder settles in the burner of the boiler and on the surfaces of the heat-exchange equipment for recovering heat from the combustion gas, which progressively decrease their effectiveness. For this reason, the manufacture must be often discontinued for cleaning and maintaining the burner and this equipment, which limits the production rate of the polymer-bitumen membranes manufacturing lines.

Moreover, the filler that is present in the vent gas from the melting tanks can reach the chimney and a fine powder emission occurs, which is harmful for health and environment.

U.S. Pat. No. 10,080,987 B1 relates to a system for making an HMA-type asphalt (Hot Mix Asphalt) in which a so-called "pug mill" is used to mix fine and coarse asphalt particles, and in which a combination of a dryer, a cyclone separator and EP 1 867 784 A1 discloses a process to make a pavement material based on a conglomerate comprising solid particles embedded in such a binding material as bitumen, wherein steps are provided of heating at least one part of the solid particles up to a temperature higher than 100° C., of collecting the vapours formed therefrom, and of separating these vapours into a fraction of suspended materials and a gaseous fraction, in particular, by bringing the vapours into contact with a washing liquid such as water, and possibly a step of settling the suspended materials. The process aims at preventing vapours containing harmful gaseous substances or fine particulate from being emitted into atmosphere while making the pavement material.

U.S. Pat. No. 4,153,471 relates to an improvement of previously known recycling processes of asphalt-aggregate compositions, including a step of directly exposing the latter to hot combustion gas, typically within elongated rotating drums. From such processes, gaseous mixtures containing volatile hydrocarbon and mineral particulate are obtained, which are sent into a treatment chamber along with a flame in order to be burnt, for atmospheric pollution control purposes.

SUMMARY OF THE INVENTION

It is therefore an object of the present invention to provide a plant for treating by incineration bad-smelling gases released by pieces of equipment of a plant, such as a polymer-bitumen membranes production line, said gases containing bitumen vapours and thin powder, which avoids that the powder settles on the burner and on possible heat-exchange surfaces of heat recovery equipment, so as to perform cleaning/maintenance operations less often.

It is also an object of the invention to provide such a plant that can further reduce the smell of the waste matter produced by the production line, in particular, the smell of the exhaust combustion gas.

These and other objects are achieved by a process and by a plant, as defined by the independent claims n. 1 and 7, respectively, for treating a raw vent gas containing bitumen vapours and released by at least one piece of equipment of a plant, for example of a polymer-bitumen membranes production line, the piece of equipment configured to carry out a step of treating a filler powder, wherein the piece of equipment is supplied with the filler powder and/or performs a mixing operation of the filler powder with the bitumen, for example, for making polymer-bitumen membranes, during the step of treating the filler the raw vent gas turning from a normal raw vent gas, substantially free from powder, into a powder-containing raw vent gas the also contains an amount of said powder filler. Particular embodiments of the invention are defined by the dependent claims.

The filler powder typically consists of particles having a diameter, which can be a true diameter or an equivalent diameter, smaller than 630 µm. In particular, the grain size distribution curve of the filler powder normally has a maximum at about 0.7 µm.

In a first aspect of the invention, this process comprises the steps of:
prearranging a gas-washing device gas;
prearranging a boiler;
first conveying the raw vent gas into the gas-washing device;
wherein the gas-washing device is configured to receive a washing solution containing a surfactant and to bring the raw vent gas into contact with the washing solution;
contact of the raw vent gas with the washing solution and removing the amount of filler powder from the powder-containing raw vent gas, such that the gas-washing device releases a purified vent gas that is substantially free from the filler powder;
second conveying of the purified vent gas into the boiler and burning the bitumen vapours, thus obtaining a combustion gas.

In a second aspect of the invention, the plant comprises:
a gas-washing device;
a boiler;
a first vent gas duct between the at least one piece of equipment and the gas-washing device;
a second vent gas duct between the gas-washing device and the boiler; wherein the gas-washing device is configured to receive a washing solution containing a surfactant and to bring the raw vent gas into contact with the washing solution,
such that said powder is removed from the gas and a purified vent gas is released substantially free from the filler powder;
a suction device arranged to convey the raw vent gas through the first vent gas duct and the purified vent gas through the second vent gas duct.

This way, only a negligible amount of filler reaches the burner of the boiler and possible heat-exchange surfaces of the boiler, which makes it possible to reduce the frequency of maintenance and/or cleaning operations, to maintain their effectiveness in the time and, in particular, to prevent them to be worn away.

It has been also observed that, surprisingly, most unburnt bad-smelling compounds that are present in the vapours are retained by this filtration system along with the filler, which are thought to travel through the burner without being burnt, and this improves the smell-removal performances with respect to the cited prior art, and further lower the bad-smelling emissions.

The surfactant that is present in the washing liquid serves to increase the wettability of the particles forming the powder, by increasing their affinity to water, so as to retain these particles in the mass of the washing solution and to prevent them from leaving the washing solution along with the purified vent gas, in the step of second conveying/ through the second vent gas duct.

The surfactant can be chosen according to the nature of the powder that is present in the raw vent gas. In particular, in the case of a polymer-bitumen membranes production plant, the powder is the filler that is added to the bitumen to make the membrane, and usually essentially consists of calcium carbonate $CaCO_3$. In this case, the surfactant is preferably a non-ionic surfactant. For instance, the non-ionic surfactant can comprise an aliphatic glycol, such as propylene glycol. As an alternative, the surfactant can be cetyltrimethylammonium chloride, also known as cetrimonium chloride or CTAC. Preferably, the concentration of the surfactant lies between 0.1% and 1.0% by weight, even more preferably between 0.2% and 0.4% by weight.

Preferably, the gas-washing device comprises a tank having an inlet mouth for the raw vent gas and an outlet mouth for the purified vent gas, wherein the inlet mouth and the outlet mouth are connected to the first and to the second vent gas duct, respectively, the tank configured to form a liquid head at a height above the bottom of the tank that is higher than the height of the inlet mouth, so that in a step of filling the tank with the washing solution, the inlet port is submerged by the washing solution and, in a step of introducing the raw vent gas into the tank through the inlet mouth, the raw vent gas performs a step of bubbling through the washing solution contained in the tank, which causes the powder to be removed from the powder-containing raw vent gas.

As an alternative, or in addition, the gas-washing device includes a washing tower comprising:
a first inlet mouth for the raw vent gas and a first outlet mouth for the purified vent gas arranged at opposite end portions of the washing tower;
a second inlet mouth and a second outlet mouth for the washing solution arranged at opposite end portions of the washing tower;
wherein the first inlet mouth and the first outlet mouth are connected to the first and at the second vent gas duct, respectively,
wherein the second inlet mouth is arranged at one of the end portions selected between:
the end portion at which the first outlet mouth is arranged,
the end portion at which the first inlet mouth is arranged.

This way, by performing:
a step of conveying the washing solution through the washing tower between the second inlet mouth and the second outlet mouth;
the step of first conveying, comprising a step of conveying the raw vent gas through the washing tower between the first inlet mouth and the first outlet mouth, a step is carried out of counter-current or equicurrent contacting, respectively, the washing solution and of the raw vent gas, and a removal of the powder from the powder-containing raw vent gas takes place.

Preferably, the process provides a step of directly conveying the normal raw vent gas into the boiler, wherein, while the at least one piece of equipment performs the step of treating the filler, the step of directly conveying is discontinued, and the steps of first and second conveying are carried out.

To this purpose, in an exemplary embodiment according to the second aspect of the invention, the plant also comprises:
a direct vent gas duct between the at least one piece of equipment and the boiler;
a valve group connected to the first vent gas duct and to the direct vent gas duct, in order to selectively deviate the normal raw vent gas from the first vent gas duct to the direct vent gas duct and the powder-containing raw vent gas from the direct vent gas duct to the first vent gas duct.

As described, some pieces of equipment or even a single piece of equipment of the production line involved in the polymer-bitumen membranes production cycle release(s) powder-containing gas during some filler treatment operations, typically during the steps of feeding the filler into the pieces of equipment and during an early step of mixing it with the bitumen.

Preferably, at a given instant, the steps of first and second conveying the powder-containing raw vent gas are carried out from only a group of pieces of equipment that are currently engaged in such a step of treating the filler, while the step of directly conveying the normal raw vent gas is carried out from the remainder piece(s) of equipment of the plurality, which are not engaged is any filler treatment operation.

To this purpose, in an exemplary embodiment according to the second aspect of the invention, the first vent gas duct and the direct vent gas duct have respective connection branches to each piece of equipment of the plurality of pieces of equipment, and the above mentioned valve group is arranged on each of these connection branches to selectively open/close each connection branch between the respective piece of equipment and the first vent gas duct or the direct vent gas duct. Each valve group can comprise two two-way valves, one arranged along the connection branch to the first vent gas duct and the other arranged along the connection branch to the direct vent gas duct, or can comprise a diverting three-way valve with an outlet mouth arranged at the root of the connection branch to the direct vent gas duct and the other outlet mouth arranged at the root of the connection branch to the first vent gas duct.

In this case, the operation of the valve group for diverting the flow of the raw vent gas from a predetermined piece of equipment from the direct vent gas duct to the first vent gas duct, or vice-versa, is carried out automatically when the step of treating the filler starts or ends, respectively, in this piece of equipment.

To this purpose, the plant preferably comprises a control unit configured to:
  receive an ongoing filler treatment signal indicating that a filler treatment step is being carried out in that piece of equipment, and
  transfer a raw vent gas redirect signal to the valve group to redirect the raw vent gas from the direct raw gas duct to the first raw gas duct, according to whether the piece of equipment is carrying out/is not carrying out the step of treating the filler.

The ongoing filler treatment signal can be generated in a way known to the skilled person, for instance, it can be a signal coming from a limit switch device system that detects the open or the closed state of a filler inlet valve of each piece of equipment that can perform a step of treating the filler, such system for example cooperating with a timer switch that switches once a predetermined time has elapsed since the opening and/or the closing of such an inlet valve. As an alternative, this ongoing filler treatment signal can be automatically generated when an opening command is sent to the inlet valve, or when an actuation command is sent to a different means for feeding the filler into the piece of equipment, or the signal can be even triggered by a powder presence detector arranged to detect the presence of powder above the bitumen that is present in the piece of equipment.

Preferably, the process provides a step of mixing the raw vent gas or the purified or normal raw vent gas with external air, preferably withdrawn at a temperature set between 5° C. and 40° C., such that a mixture external air/raw vent gas is obtained. To this purpose, the plant comprises a means for mixing external air with the raw, purified or normal raw vent gas, preferably on a branch arranged for feeding boiler primary air, to which the direct vent gas duct and the second vent gas duct converge.

Advantageously, the step of second conveying of the purified vent gas and/or the step of directly conveying are carried out in such a way to keep the purified vent gas within the boiler for a residence time of at least 2 seconds. To this purpose, the size of the combustion chamber of the boiler and the features of the suction device, which is typically a fan, are selected in a coherent way to provide a predetermined gas flowrate through the combustion chamber to provide residence time longer than this minimum value.

Preferably, the step of second conveying and/or the step of directly conveying are carried out in such a way to feed the mixture into the boiler as primary air. To this purpose, the second vent gas duct and/or the direct vent gas duct is pneumatically connected with a primary air feeding means of the boiler.

Preferably, the process provides steps of:
  measuring the oxygen and/or carbon monoxide content in the combustion gas, downstream of the boiler;
  comparing the oxygen and/or carbon monoxide content with respective predetermined lower oxygen content limit values and upper carbon monoxide content limit values;
and the step of mixing with external air provides a step of adjusting an external air proportion in the mixture, in such a way to maintain the oxygen and/or carbon monoxide content in the combustion gas above and below the predetermined limit values, respectively.

To this purpose, the plant also comprises:
  a device for measuring the oxygen and/or carbon monoxide content in the combustion gas, configured to emit a corresponding combustion gas oxygen and/or carbon monoxide concentration signal;
  a logic unit configured to:
    receive this and/or these concentration signals;
    compare this and/or these oxygen and/or of carbon monoxide concentration signals with predetermined lower and upper content limit values of oxygen and/or carbon monoxide, respectively;
    generating and transferring to the means for mixing external air an adjustment signal to adjust a proportion of external air in the mixture, so as to keep the content of oxygen and/or carbon monoxide above and below the predetermined limit values, respectively.

The above described vent gas treatment process, aiming at reducing bad-smelling emissions, relates to a vent gas that contains bitumen vapours and a filler powder, however, it can be also used to treat industrial vent gas in general, in which there is a problem of reducing the smells and at the same time powder solids are present in a vent gas stream, as it is the case with the vent gas manifolds in some distillation plants, filtration plants in which filters are provided that require preparing a fossil flour pre-panel, and the like.

It falls within the scope of the invention also a process for making polymer-bitumen membranes, comprising a step of mixing a filler powder with bitumen, thus obtaining a polymer-bitumen membrane, and obtaining a raw vent gas that contains bitumen vapours and a residue of the filler powder, and also comprises a process for treating the raw vent gas in which at least one of the above described features is provided.

It falls within the scope of the invention also an apparatus for making polymer-bitumen membranes, configured to carry out a step of mixing a filler powder with bitumen, thus obtaining a polymer-bitumen membrane, and obtaining a raw vent gas that contains bitumen vapours and a residue of the filler powder, and also comprising a plant for treating said raw vent gas including at least one of the above described features.

BRIEF DESCRIPTION OF THE DRAWINGS

The invention will be now shown with the description of its exemplary embodiments, exemplifying but not limitative, with reference to the attached drawings, in which:

FIG. 1 shows a process flow diagram of a plant for treating bitumen vapours containing a fine powder according to the invention;

FIG. 2 shows a process flow diagram of a plant for treating such vapours according to an exemplary embodiment of the invention, in which the gas-washing device comprises a tank containing a washing solution, and the raw vent gas to be purified are fed below the head of this washing solution;

FIG. 3 shows a process flow diagram of a plant for treating such vapours according to an exemplary embodiment of the invention, in which the gas-washing device comprises a washing tower arranged to form a countercurrent flow of the raw vent gas to be purified and of the washing solution;

FIG. 4 shows a process flow diagram of a plant for treating such vapours according to an exemplary embodiment of the invention, in which a direct vent gas duct to the oven and a valve group for selectively deviating the raw vent gas from the gas-washing device to the direct duct and vice-versa, are also provided;

FIG. 7 shows a process flow diagram of plant similar to that of FIG. 5, in which a means is provided for mixing external air with the raw vent gas fed to the boiler;

FIG. 8 diagrammatically shows a modification of the flow diagram of FIG. 8;

DESCRIPTION OF PREFERRED EXEMPLARY EMBODIMENTS

Figure 5:
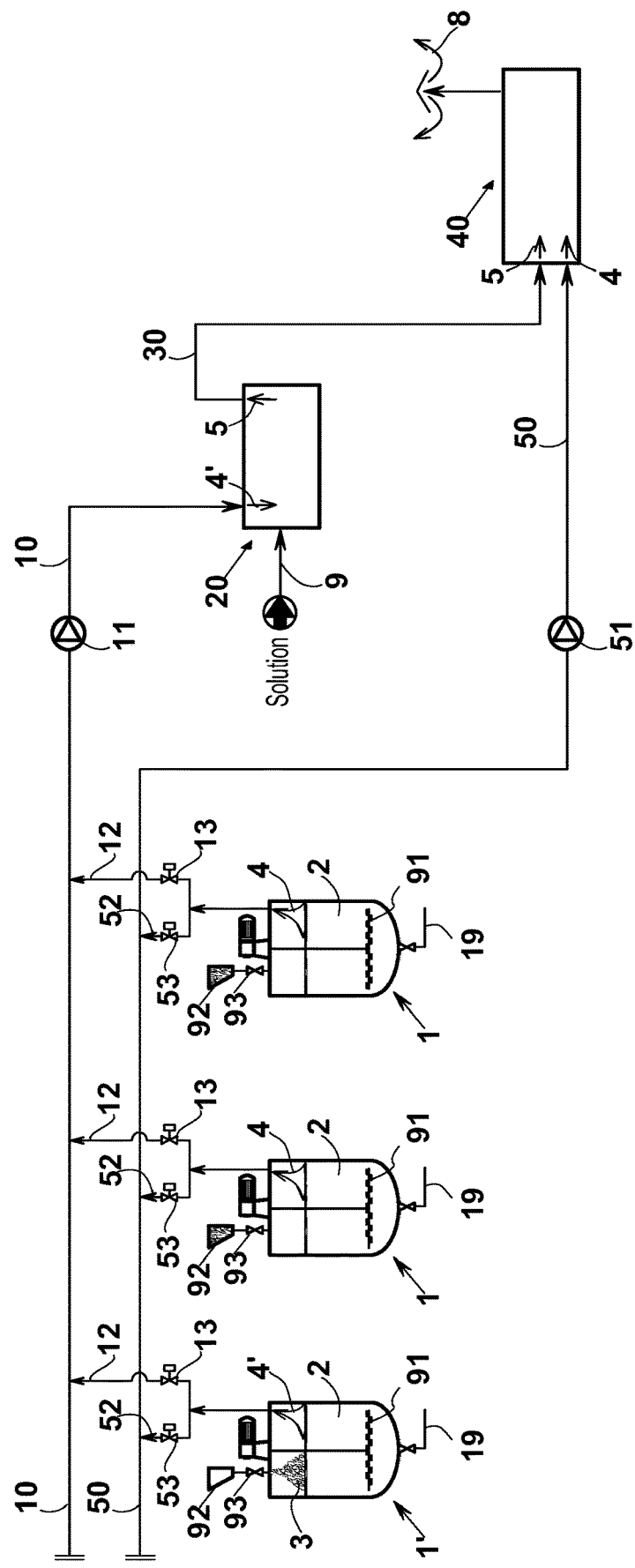
FIG. 5 shows a process flow diagram of a plant for treating such vapours according to an exemplary embodiment of the invention which is suitable for a production line that comprises a plurality of pieces of equipment configured to treat bitumen and filler powder, in which a direct vent gas duct is provided as shown in FIG. 4, and a plurality of connection branches are provided to the direct vent gas duct and to the duct through the gas-washing device.

With reference to the attached drawings, a process and a plant are described for treating a raw vent gas released by the pieces of equipment of a plant, typically a polymer-bitumen membranes production line. The described technique can be used, in particular, for treating vent gas coming from the melting tanks of a polymer-bitumen membranes production line, typically in the steps of loading and early mixing a filler powder such as fine talc in which, for instance, most particles have a dimension about a maximum of the grain size distribution curve at about 0.7 μm.

FIG. 1 diagrammatically shows a melting tank 1 of a plant such as a polymer-bitumen membranes production line, i.e. a piece of equipment used as a mixer of bitumen 2 with a filler powder 3, as well as a temporary storage and supply unit of bitumen 2. Melting tank 1 typically comprises a tank 90, a mixing means 91 for mixing bitumen 2 and filler powder 3, in this case a mechanical agitator 91, as well as a filler powder feeding means 3, in this case, for instance, a hopper 92 and/or of a valve 93 to be opened when performing the steps of loading filler powder 3 into tank 90. The means for feeding filler powder 3 can also comprise a means for conveying filler powder 3, not shown, from a storage of filler powder 3 to melting tank 1, for example a pneumatic conveyor, a bucket conveyor or of any other known for solid matter conveyor, comprising an electromechanical actuation system. Melting tank 1 is also equipped with a discharging line 19 and a corresponding discharge valve in order to transfer the bitumen-filler mixture to a subsequent operation, typically to a polymer-bitumen membrane production step.

Melting tank 1 is maintained under suction by a gas vent line 10,30 and a suction device 11, as described more in detail hereinafter, the main reason of which is to prevent bad-smelling vapours from diffusing into the working areas. Due to the suction, a gas stream of raw vent gas 4,4' is steadily released by piece of equipment 1 during each step of working cycle in which it is involved.

As anticipated, the step of treating filler powder 3 in melting tank 1 essentially includes the operations of feeding filler powder 3 into tank 90 and of mixing filler powder 3 with bitumen 2. In other steps of the working cycle in which melting tank 1 is involved, i.e. when only bitumen 2 is present within tank 90, or once filler powder 3 has been fully incorporated into bitumen 2, the raw vent gas is a normal raw vent gas 4 that is substantially free from filler powder 3. Instead, during the step of treating filler powder 3, including the above operations, the raw vent gas is turned from substantially powder-free normal raw vent gas 4 into a powder-containing raw vent gas 4', i.e. a vent gas that contains an amount of said filler powder 3 beside the bitumen vapours.

The process according to the invention provides prearranging a gas-washing device 20, in addition to boiler 40 having for instance the features described in EP 3018410 A1. Gas-washing device 20 and boiler 40 are arranged in such a way that raw vent gas 4,4', in particular powder-containing raw vent gas 4' is first conveyed into gas-washing device 20 and then into boiler 40, as a purified, substantially powder-free vent gas 5, or directly as normal raw vent gas 4.

To this purpose the plant comprises, in addition to gas-washing device 20 and boiler 40, a first vent gas duct 10 between piece of equipment 1 and gas-washing device 20, and a second vent gas duct 30 between gas-washing device 20 and boiler 40. The plant also comprises a suction device 11 arranged to convey raw vent gas 4,4', in particular powder-containing raw vent gas 4', and purified vent gas 5 through first vent gas duct 10 and second vent gas duct 30, respectively. In a preferred exemplary embodiment, the suction device is a fan 11, and is arranged along first vent gas duct 10, i.e. between piece of equipment 1 and gas-washing device 20.

Gas-washing device 20 is configured to receive a washing solution 9 containing a surfactant, and to bring raw vent gas 4,4' into contact with washing solution 9, in order to remove the amount of filler powder 3 that is present in powder-containing raw vent gas 4', and to obtain purified vent gas 5 from gas-washing device 20, substantially free from filler powder 3.

Subsequently, purified vent gas enters into boiler 40, in which the combustion of the bitumen vapours contained therein occurs, thus obtaining a combustion gas 8, for example in the way described in EP 3018410 A1.

The surfactant present in washing solution 9 can be selected among well-known surfactant, at a concentration that can depend on the selected surfactant type and on the type of washing device 20 used.

The surfactant present in washing solution 9 can be also chosen according to the nature of the powder that is present in powder-containing raw vent gas 4'. In particular, in the case of a plants for making polymer-bitumen membranes, the powder is the filler that is added to the bitumen to manufacture the membrane, which is usually essentially consist of calcium carbonate $CaCO_3$. In this case, the surfactant is preferably a non-ionic surfactant. For example, the non-ionic surfactant can comprise an aliphatic glycol, in particular propylene glycol. As an alternative, the surfactant can be cetyltrimethylammonium chloride, also known as cetrimonium chloride or CTAC. Preferably, the concentration of such surfactant in washing solution 9 is set between 0.1% and 1.0% by weight on the amount of washing solution 9, more preferably it is set between 0.2% and 0.4% by weight on the amount of washing solution 9. Preferably, gas-washing device 20 has one of the forms shown in FIGS. 2 and 3.

In particular, with reference to FIG. 2, gas-washing device 20 comprises a tank 25 with an inlet mouth 21 and an outlet mouth 23 for raw vent gas 4,4', in particular for powder-containing raw vent gas 4', and for purified vent gas 5, respectively, said inlet and outlet mouths connected to first vent gas duct 10 and to second vent gas duct 30, respectively. Inlet mouth 21 of raw vent gas 4,4' is arranged at a predetermined height h from a bottom 29 of tank 25. For instance, as shown in the figure, inlet mouth 21 can comprise an open end of a portion 15 of first vent gas duct 10 that is arranged as a dip tube within tank 25, but can also comprise a nozzle, not shown, that is arranged on the shell of tank 25 at distance h from bottom 29.

Tank 25 is configured to form a liquid head at a height H from bottom 29 above inlet mouth 21, so that the latter is submerged by washing solution 9. More in detail, tank 25 is configured to be filled with washing solution 9 through a duct 39 and a liquid inlet nozzle 22 up to a predetermined level H over bottom 29 higher than height h of inlet mouth 21 above bottom 29, so that inlet mouth 21 of raw vent gas 4,4' is submerged by washing solution 9. This way, by introducing raw vent gas 4,4' into tank 25 through inlet mouth 21, it bubbles through washing solution 9 contained therein, which allows removing filler powder 3 that is present in the gas, in the case of powder-containing raw vent gas 4'. A liquid discharge nozzle 24 is also provided that can be used in order to periodically change solution 9 of gas-washing device 20, or to allow a continuous flow, a gooseneck tube portion being preferably provided vertically extending up to height H above bottom 29, in order to maintain the liquid head.

As an alternative thereto, as shown in FIG. 3, or in addition thereto, in a modification not shown, gas-washing device 20 still comprises a tank 125, but in the form of a washing tower 125, i.e. an elongated tank with an inlet mouth 121 and an outlet mouth 123 for raw vent gas 4,4', in particular for powder-containing raw vent gas 4', and for purified vent gas 5, respectively, and connected to first vent gas duct 10 and to second vent gas duct 30, respectively. Washing tower 125 also comprises a second inlet mouth 122 and a second outlet mouth 124 for washing solution 9, which are also arranged at opposite end portions of washing tower 125. In the exemplary embodiment as depicted, second inlet mouth 122 is arranged at an end portion 123' at which first outlet mouth 123 is arranged, in such a way that, by conveying raw vent gas 4,4' through washing tower 125 between first inlet mouth 121 and first outlet mouth 123, and by conveying washing solution 9 between second inlet mouth 122 and second outlet mouth 124 a step is performed of countercurrent contacting raw vent gas 4,4' and washing solution 9. In an exemplary embodiment, not shown, second inlet mouth 122 is arranged at an end portion 121' at which first inlet mouth 121 is arranged, in such a way that, by conveying raw vent gas 4,4' through washing tower 125 between first inlet mouth 121 and first outlet mouth 123 and by conveying washing solution 9 between second inlet mouth 122 and second outlet mouth 124 a step is performed of equicurrent contacting the raw vent gas and washing solution 9.

Such step of countercurrent or equicurrent contacting allows, in the case of powder-containing raw vent gas 4', removing of filler powder 3 present therein.

In the exemplary embodiment of FIG. 3, which is a preferred embodiment, washing tower 125 is arranged vertically, even if in not shown exemplary embodiments a horizontal arrangement of washing tower 125 is possible, or in any case an arrangement at an angle with respect to the vertical direction. Moreover, in the exemplary embodiment of FIG. 3, washing tower 125 is arranged with end portion 121' as a lower end portion, and therefore also with first vent gas inlet mouth 121 as a lower mouth, which it is preferred, even if, in not shown exemplary embodiments an arrangement of washing tower 125 is possible with end portion 121' as an upper end portion and therefore with first vent gas inlet mouth 121 as an upper mouth.

However, the invention is not limited by the above-described forms of gas-washing device 20.

In an exemplary embodiment, the method provides conveying only powder-containing raw vent gas 4' through gas-washing device 20, powder-containing raw vent gas being released by piece of equipment 1 only during the steps of treating filler powder 3, as specified, and provides conveying substantially powder-free normal raw vent gas 4 directly into the boiler, normal raw vent gas being released in the other steps of the manufacture cycle in which piece of equipment 1 is involved.

FIG. 4 it relates to an exemplary embodiment of the plant configured to this purpose, in which a direct vent gas duct 50 between piece of equipment 1 and boiler 40, as well as a valve group 13,53 connected to first vent gas duct 10 and to direct vent gas duct 50 are also provided, so as to selectively deviate normal raw vent gas 4 from first vent gas duct 10 to direct vent gas duct 50, at the end of each step of treating filler powder 3, and deviate powder-containing raw vent gas 4' from direct vent gas duct 50 to first vent gas duct 10, at the beginning each step of treating filler powder 3 by piece of equipment 1. In the exemplary embodiment of FIG. 4, the direct vent gas duct has a suction device 51 for normal raw vent gas, typically a fan 51, different from suction device 11 for powder-containing raw vent gas.

Actually, a polymer-bitumen membranes production line or unit can comprise a plurality of melting tanks 1,1'. At a given instant, one or some melting tanks 1', can be performing a step of treating filler powder 3 and of releasing therefore powder-containing raw vent gas 4', while the other melting tanks 1 are carrying out a step before the step of treating filler powder 3, in particular a step of loading/storing bitumen 2, before receiving filler powder 3, or a step after the step of treating filler powder 3, in particular a step of late mixing bitumen 2 and filler powder 3, or a step of feeding bitumen 2 containing filler powder 3 to the impregnation basins; these latter melting tanks 1 release therefore normal raw vent gas 4, which is substantially free from filler powder 3.

FIG. 5 relates to an exemplary embodiment of such a plant that comprises a plurality of melting tanks 1,1' configured to conveying only powder-containing raw vent gas 4' coming from piece of equipment 1' during a step of treating filler powder 3 through gas-washing device 20. Three pieces of equipment 1,1' are shown, one piece of equipment 1' of which is engaged in a step of treating filler powder 3 and releases a powder-containing raw vent gas 4', while the other two pieces of equipment 1 are not engaged with this step of treatment and release a normal raw vent gas 4. In this case, first vent gas duct 10 and direct vent gas duct 50 have respective connection branches 12,52 to each piece of equipment 1,1', and on each these connection branches 12,52 a valve group 13,53 is arranged that is configured to selectively open/close each connection branch 12,52 between the corresponding piece of equipment 1,1' and first vent gas duct 10 or direct vent gas duct 50, respectively. Even if the valve group of FIG. 5 comprises two two-way valves 13,53, one of which is arranged along connection branch 12 to first vent gas duct 10 and the other is arranged along connection branch 52 to direct vent gas duct 50, in an exemplary embodiment not shown, this valve group can comprise a diverting three-way valve that has an outlet mouth arranged at the root of connection branch 52 to direct vent gas duct 50 and has the other outlet mouth arranged at the root of connection branch 12 to first vent gas duct 10.

Figure 6:
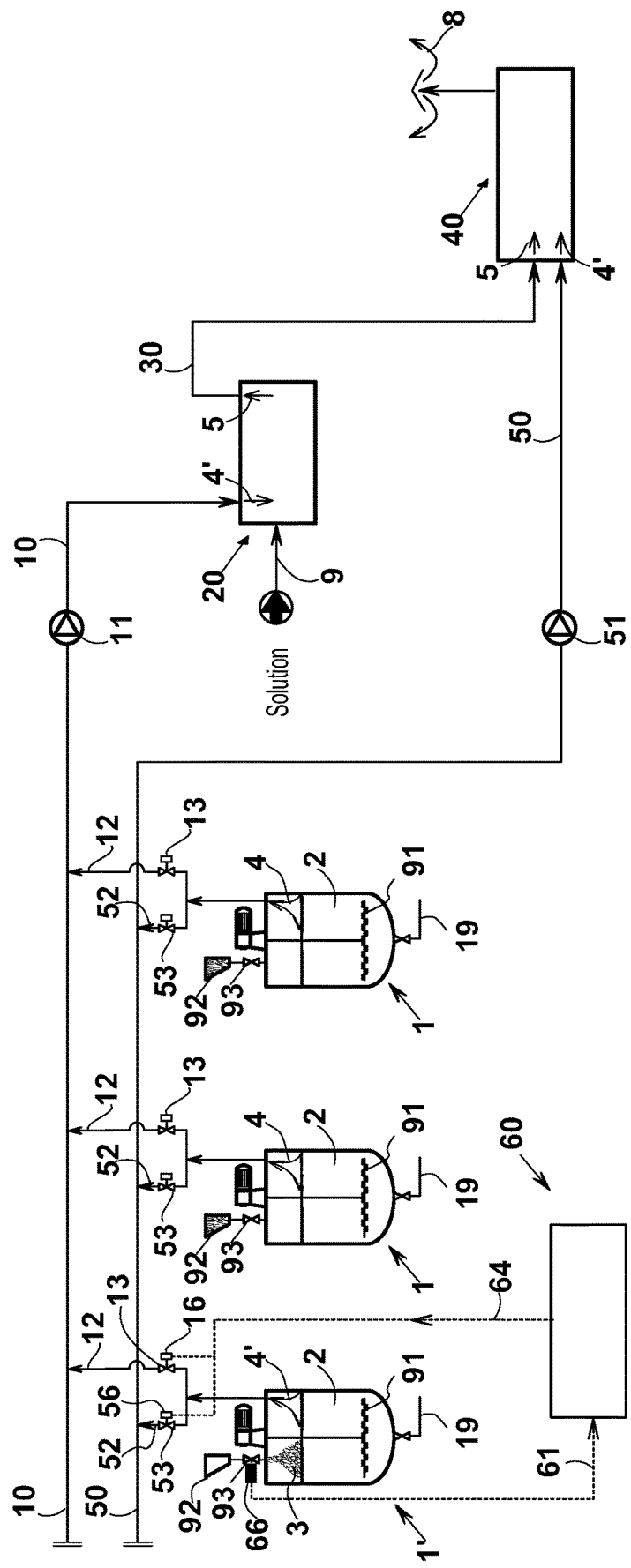
FIG. 6 shows a process flow diagram of plant similar to that of FIG. 5, configured to allow an automatic switch of each piece of equipment between the direct vent gas duct and the duct through the gas-washing device.

Preferably, valve group 13,53 has servo-actuated actuators 16, 56 in order to be automatically operated when the corresponding piece of equipment 1,1' starts or ends the step of treating filler powder 3. FIG. 6 relates to an exemplary embodiment of the plant that is configured to this purpose, and that comprises a plurality of pieces of equipment or melting tanks 1,1'. This exemplary embodiment is valid also in the case of a production line comprising a single melting tank 1 as shown in FIG. 4. In this case, a control unit 60 is provided that is configured to receive a start/stop signal 61 of a step of treating filler powder 3 in piece of equipment 1'/1, and also configured to transfer to valve group 13,53, i.e. in this case to actuators 16, 56, signals 64 of diverting normal raw vent gas 4, which is being turned into powder-containing raw vent gas 4', from direct vent gas duct 50 into first vent gas duct 10, and of diverting powder-containing raw vent gas 4', which is being turned into normal raw vent gas 4, from first vent gas duct 10 into direct vent gas duct 50, respectively.

In the exemplary embodiment of FIG. 6, start/stop signal 61 of a step of treating filler powder 3 is generated by a limit switch device system 66 that is associated with the inlet valve 93 of filler powder 3 in order detect the open/closed status indicating whether valve 93 of filler powder 3 is open and/or closed. Preferably, a timer switch device is provided for delaying the generation and the transmission of signal 61 of diverting raw vent gas 4,4' with respect to the instant at which valve 93 is closed, based on a standard mixing time within which it is believed that filler powder 3 and bitumen 2 are fully mixed. For simplicity, only signals 61, 64 are shown that relate to piece of equipment 1', but it is understood that a similar configuration is used for shown pieces of equipment 1. In an exemplary embodiment, not shown, signal 64 of diverting normal raw vent gas 4 can be automatically generated when an opening command is sent to the inlet valve 93 of the filler, or when an actuation command is sent to a different means, if present, for conveying filler 3 as specified above. As an alternative, signal 64 of diverting normal raw vent gas 4 can be triggered by a powder presence detector, not shown, arranged above the head of bitumen 2 in piece of equipment 1, and configured to emit a signal indicating the presence and/or absence of powder in the space above bitumen 2.

In a modification, the process provides mixing normal raw vent gas 4 or purified vent gas 5 with external air 6, preferably withdrawn at a temperature set between 5° C. and 40° C., such that a mixture 7 of external air and purified vent gas 5 or normal raw vent gas 4 is obtained.

FIG. 7 relates to an exemplary embodiment of the plant that is configured to this purpose, wherein a mixing means 54 is provided for mixing external air 6 with the raw vent gas fed to the boiler, which can be purified vent gas 5 coming from second vent gas duct 30 or normal raw vent gas 4 coming from direct vent gas duct 30. Preferably, as shown in FIG. 8, mixing means 54 are arranged along a feed branch 55 of primary air to boiler 40 to which second vent gas duct 30 and direct vent gas duct 50 converge.

Advantageously, purified vent gas 5 and/or normal raw vent gas 4 are conveyed, in such a way to keep the raw vent gas in the combustion chamber of boiler 40 for a residence time of at least two seconds. To this purpose, the size of the combustion chamber and the features of suction device 11, typically a fan, are selected cooperatively.

Preferably, the process provides measuring the oxygen and/or carbon monoxide content in the combustion gas 8, downstream of boiler 40, and comparing this detected contents with a predetermined $O_2$ content lower limit value and with a predetermined CO content upper limit value, and the step of mixing with external air 6 includes a step of adjusting a proportion of external air 6 in the mixture 7, in such a way to maintain the content of oxygen and/or carbon monoxide in the combustion gas 8 above and below the predetermined limit values, respectively.

To this purpose, as shown still in FIG. 7, the plant also comprises a device 80 for measuring the content of oxygen and/or carbon monoxide in the combustion gas 8, configured to emit a corresponding $O_2$ and/or CO concentration signal 81 in the combustion gas, and also comprises a logic unit 60' configured to receive the concentration signal and/or the concentration signals 81, in order to compare the latter with a predetermined lower $O_2$ content limit value and with a predetermined upper CO limit value, respectively, and to generate and transfer to mixing means 54 an adjustment signal 82 for adjusting a proportion of external air 6 in the mixture 7, so as to keep the content of oxygen and/or carbon monoxide respectively above and below these values limit.

Figure 9:
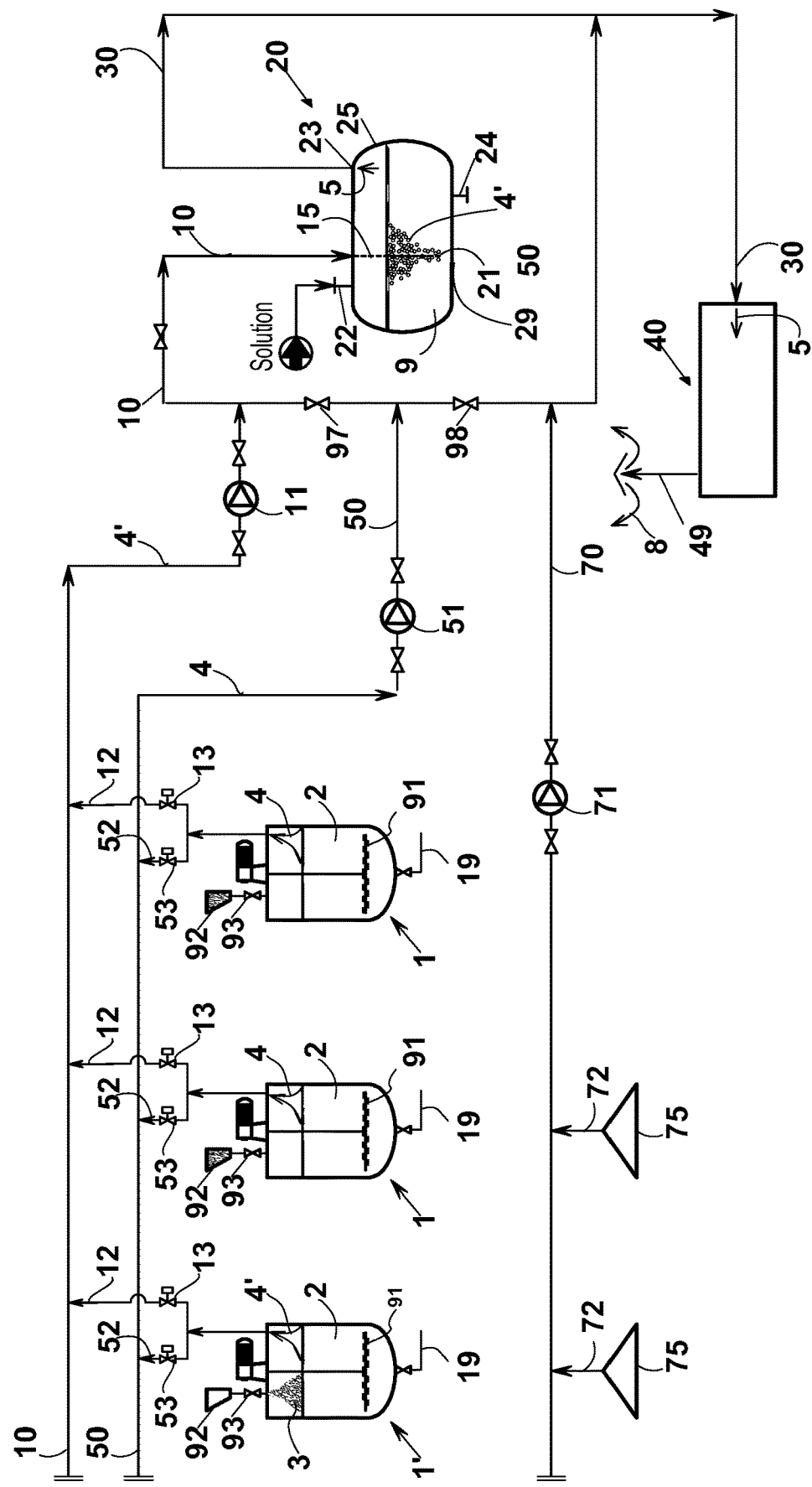
FIG. 9 shows a process flow diagram of a plant for treating also vent gas that are always free from powder in the oven as a separate feed.

FIG. 9 diagrammatically shows an exemplary embodiment of the plant, in which a further direct vent gas duct 70 is provided to which converge suction branches 76 coming from respective extractor hoods 75 of filler powder-free vapours. This duct has an own suction device 71, typically a fan 71. Moreover, first vent gas duct 10, direct vent gas duct 50 and the further direct vent gas duct 70 converge to a manifold 99 along which shut-off valves 97,98 are provided, possibly equipped with respective actuators, not shown, for remote control. In its own normal position, valve 97 is closed in order to separate first vent gas duct 10, through which powder-containing raw vent gas 4' flows towards gas-washing device 20, from direct vent gas ducts 50 and 70, through which substantially powder-free raw vent gas flows directly into boiler 40. Valve 98, instead, is normally open. This structure of manifold 99 makes it possible to use each of fans 11, 51, and 71 as a spare fan for any other of them, in case of out-of-service.

The foregoing description of exemplary specific embodiments of the invention will so fully reveal the invention according to the conceptual point of view, so that others, by applying current knowledge, will be able to modify and/or adapt for various applications such embodiments without further research and without parting from the invention, and it is therefore to be understood that such adaptations and modifications will have to be considered as equivalent to the specific embodiments. The means and the materials to perform the different functions described herein could have a different nature without, for this reason, departing from the field of invention. It is to be understood that the phraseology or terminology employed herein is for the purpose of description and not of limitation.

The invention claimed is:

1. A process for treating a raw vent gas containing bitumen vapours released by at least one piece of equipment configured to carry out a step of treating a filler powder, wherein said piece of equipment is supplied with said filler powder and/or performs a mixing operation of said filler powder with said bitumen, during said step of treating said filler powder, said raw vent gas turning from a powder-free normal raw vent gas, into a powder-containing raw vent gas that also contains an amount of said filler powder, said process comprising the steps of:
   prearranging a gas-washing device configured to supply a washing solution containing a surfactant;
   prearranging a boiler;
   first conveying said raw vent gas containing an amount of said filler powder into said gas-washing device;
   bringing said raw vent gas containing an amount of said powder into contact with filler said washing solution containing the surfactant;
   removing said amount of filler powder from said powder-containing raw vent gas;
   releasing, by said gas-washing device a purified vent gas substantially free from said filler powder;
   second conveying said purified vent gas into said boiler and burning said purified vent gas, thus obtaining a combustion gas,
   wherein said process comprises a step of:
   directly conveying said normal raw vent gas into said boiler, wherein said step of directly conveying is discontinued and said steps of first and second conveying are carried out while said at least one piece of equipment performs said step of treating said filler powder.

2. The process according to claim 1, wherein said piece of equipment is a part of a polymer-bitumen membranes production line.

3. The process according to claim 1, wherein said step of prearranging said gas-washing device provides the steps of:
   prearranging a tank having an inlet mouth for said raw vent gas and an outlet mouth for said purified vent gas;
   filling said tank with said washing solution up to a predetermined level over a bottom of said tank, said level higher than a height of said inlet mouth over said bottom, so that said inlet mouth is submerged by said washing solution;
   wherein said step of first conveying comprises a step of introducing said raw vent gas into said tank through said inlet mouth, and
   bubbling said raw vent gas through said washing solution contained in said tank, in order to carry out said step of bringing said raw vent gas into contact with said washing solution.

4. The process according to claim 1, wherein said step of prearranging said gas-washing device provides a step of prearranging a washing tower comprising:
   a first inlet mouth for said raw vent gas and a first outlet mouth for said purified vent gas arranged at opposite end portions of said washing tower;
   a second inlet mouth and a second outlet mouth for said washing solution arranged at opposite end portions of said washing tower;
   wherein said second inlet mouth is arranged in one of said end portions selected from the group consisting of:
   the end portion at which said first outlet mouth is arranged,
   the end portion at which said first inlet mouth is arranged;
   a step of conveying said washing solution through said washing tower between said second inlet mouth and said second outlet mouth,
   wherein said step of first conveying comprises a step of conveying said raw vent gas through said washing tower between said first inlet mouth and said first outlet mouth, in order to provide said step of contacting as a counter-current contacting step or as an equicurrent contacting step, respectively, of said washing solution and of said raw vent gas turning into said purified vent gas.

5. The process according to claim 1, wherein said powder-containing raw vent gas is released by a number of pieces of equipment of a plurality of pieces of equipment during the step of treatment of said filler powder, and said steps of:
   first conveying said powder-containing raw vent gas, and
   second conveying said purified vent gas
   are carried out starting from said number of pieces of equipment, while said step of directly conveying said normal raw vent gas is carried out starting from different piece(s) of equipment, not belonging to said number of pieces of equipment, of said plurality of pieces of equipment.

\* \* \* \* \*